US009834265B2

United States Patent
Stojic (10) Patent No.: US 9,834,265 B2
(45) Date of Patent: Dec. 5, 2017

(54) RUBBER TRACK SYSTEM (71) Applicant: CNH Industrial America LLC, New Holland, PA (US)

(72) Inventor: Steven M. Stojic, Chicago, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 62 days.

(21) Appl. No.: 14/740,971

(22) Filed: Jun. 16, 2015

(65) Prior Publication Data
US 2016/0368551 A1 Dec. 22, 2016

(51) Int. Cl.
*B62D 55/26* (2006.01)
*B62D 55/32* (2006.01)
*B62D 55/215* (2006.01)

(52) U.S. Cl.
CPC ............ *B62D 55/26* (2013.01); *B62D 55/215* (2013.01); *B62D 55/32* (2013.01)

(58) Field of Classification Search
CPC ......... B62D 55/21; B62D 55/26; B62D 55/32
See application file for complete search history.

(56) References Cited

U.S. PATENT DOCUMENTS

| | | | | |
|---|---|---|---|---|
| 2,040,696 A | * | 5/1936 | Johnston | B62D 55/20 305/157 |
| 2,331,350 A | * | 10/1943 | Schonitzer | B62D 55/26 305/164 |
| 2,353,124 A | * | 7/1944 | Burgess | B62D 55/211 29/891.1 |
| 2,354,650 A | | 8/1944 | Burgess | |
| 2,371,071 A | * | 3/1945 | Schonitzer | B62D 55/26 305/160 |
| 2,409,502 A | | 10/1946 | Leguillon et al. | |
| 2,494,066 A | | 1/1950 | Slemmons | |
| 3,019,062 A | * | 1/1962 | Long | B62D 55/253 305/167 |
| 3,027,200 A | * | 3/1962 | Patterson | B62D 55/253 305/182 |
| 3,282,630 A | * | 11/1966 | Harrison | B62D 55/244 305/167 |
| 3,355,225 A | * | 11/1967 | McDowell | B62D 55/26 305/53 |
| 3,700,287 A | | 10/1972 | Persin | |
| 3,870,380 A | * | 3/1975 | Korner | B62D 55/275 156/173 |
| 4,449,357 A | * | 5/1984 | Balitch | B21J 5/027 59/30 |
| 5,362,142 A | * | 11/1994 | Katoh | B62D 55/244 305/172 |

(Continued)

FOREIGN PATENT DOCUMENTS

FR 2 707 536 A1 1/1995

*Primary Examiner* — Kip T Kotter
(74) *Attorney, Agent, or Firm* — Peter K. Zacharias; Patrick M. Sheldrake (57) ABSTRACT

A tracked vehicle including a chassis, a drive train coupled to the chassis, and at least one track driven by the drive train. The at least one track having a plurality of stamped metal links each being pivotally coupled to corresponding adjacent metal links, and an elastomeric member coupled to all of the plurality of stamped metal links. The elastomeric member covers most of each of the stamped metal links.

11 Claims, 6 Drawing Sheets

(56) References Cited

U.S. PATENT DOCUMENTS

| | | | | |
|---|---|---|---|---|
| 6,076,901 A | * | 6/2000 | Rankin | B62D 55/26 |
| | | | | 305/160 |
| 6,652,044 B1 | * | 11/2003 | Katoh | B62D 55/244 |
| | | | | 305/165 |
| 7,625,049 B2 | | 12/2009 | Kurokawa | |
| 2013/0186526 A1 | | 7/2013 | Nakamura et al. | |

* cited by examiner

RUBBER TRACK SYSTEM

BACKGROUND OF THE INVENTION

1. Field of the Invention

The present invention relates to track systems for tracked vehicles, and, more particularly, to a rubber track having metal internal links.

2. Description of the Related Art

Farmers utilize a wide variety of vehicles and implements, among them are vehicle having tracked drive systems. A tracked drive is a system of vehicle propulsion in which a continuous band of treads is driven by two or more wheels. This band is typically made of modular steel plates, in the case of military vehicles and construction equipment, or rubber reinforced with steel wires in the case of agricultural or lighter construction vehicles. The large surface area of the track distributes the weight of the vehicle better than wheels on an equivalent vehicle, enabling a continuous tracked vehicle to traverse soft ground with superior traction and less likelihood of becoming stuck. An advantage of the use of metal plates is that they are both hard-wearing and damage resistant, especially in comparison to rubber tires. The aggressive nature of the track provides good traction in soft surfaces, but can damage paved surfaces. Special tracks can be configured to allow the installation of rubber pads on the treads for use on paved surfaces to prevent the damage.

Tracks are typically built from modular links, which are linked together to form a closed chain. The links are joined by a hinge like pivotal coupling, which allows the track to be flexible and wrap around a set of wheels to make an endless loop. The links are typically broad, and made of a manganese alloy steel for high strength, hardness, and abrasion resistance.

Generally, track construction and assembly are dictated by the application. For military vehicles often a track shoe that is integral to the structure is used in order to reduce track weight. In contrast, agricultural and construction vehicles often use a track with shoes that attach to the chain with bolts and do not form part of the chain's structure. This allows track shoes to break without compromising the ability of the vehicle to move and decrease productivity but increases the overall weight of the track and vehicle.

There can exist some general disadvantages of tracks, which may include a lower top speed, much greater mechanical complexity, shorter life and damage that the all-steel versions cause to what they travel over. In an urban environment vehicle laws and local ordinances often require rubberized tracks or track pads be used on tracked vehicles. A compromise between all-steel and all-rubber tracks exists: attaching rubber pads to individual track links to ensure that the tracked vehicles can travel more smoothly, quickly, and quietly on paved surfaces. While these pads may reduce a vehicle's traction, they reduce damage to pavement.

Many vehicle manufacturers provide rubber tracks instead of steel, especially for agricultural applications. Rather than a track made of linked steel plates, a reinforced rubber belt with chevron treads is used. In comparison to steel tracks, rubber tracks are lighter, make less noise, create less maximal ground pressure and do not damage paved roads. The disadvantage is that they are not as solid as steel tracks.

Generally rubber tracks are formed around a basic carcass or belt. The carcass includes an endless belt-shaped rubber-like elastic member, a number of core bars, which can be made of metal, can be embedded therein and aligned and extend in traverse direction of the track. Steel cords, which serve as tension-resistant members may be embedded in the endless elastic member to surround the core bars.

A concern about the expense of a metal linked track is the cost of the castings or forgings needed to build each link. Concerns about rubber tracks are the durability and traction.

What is needed in the art is a track system that has less expensive metal links and improved traction.

SUMMARY OF THE INVENTION

The present invention provides a hybrid metal/rubber track.

The invention in one form is directed to a tracked vehicle including a chassis, a drive train coupled to the chassis, and at least one track driven by the drive train. The at least one track having a plurality of stamped metal links each being pivotally coupled to corresponding adjacent metal links, and an elastomeric member coupled to all of the plurality of stamped metal links. The elastomeric member covers most of each of the stamped metal links.

The invention in another form is directed to a track for a tracked vehicle having a drive train. The track includes a plurality of stamped metal links each being pivotally coupled to corresponding adjacent metal links, and an elastomeric member coupled to all of the stamped metal links. The elastomeric member covering most of each of the stamped metal links.

The invention in yet another form is directed to a method of making a track for a tracked vehicle. The method includes the steps of: stamping and forming a plurality of metal links; pivotally coupling each of the metal links to two corresponding adjacent metal links; and coupling an elastomeric member to all of the stamped metal links. The elastomeric member covering most of each of the stamped metal links.

An advantage of the present invention is that metal cleats extend into the ground for superior traction.

Another advantage is that the cleats are inexpensively formed using a stamping process.

Yet another advantage is the drive of the vehicle interfaces with metal pins that are exposed on the inside of the track.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
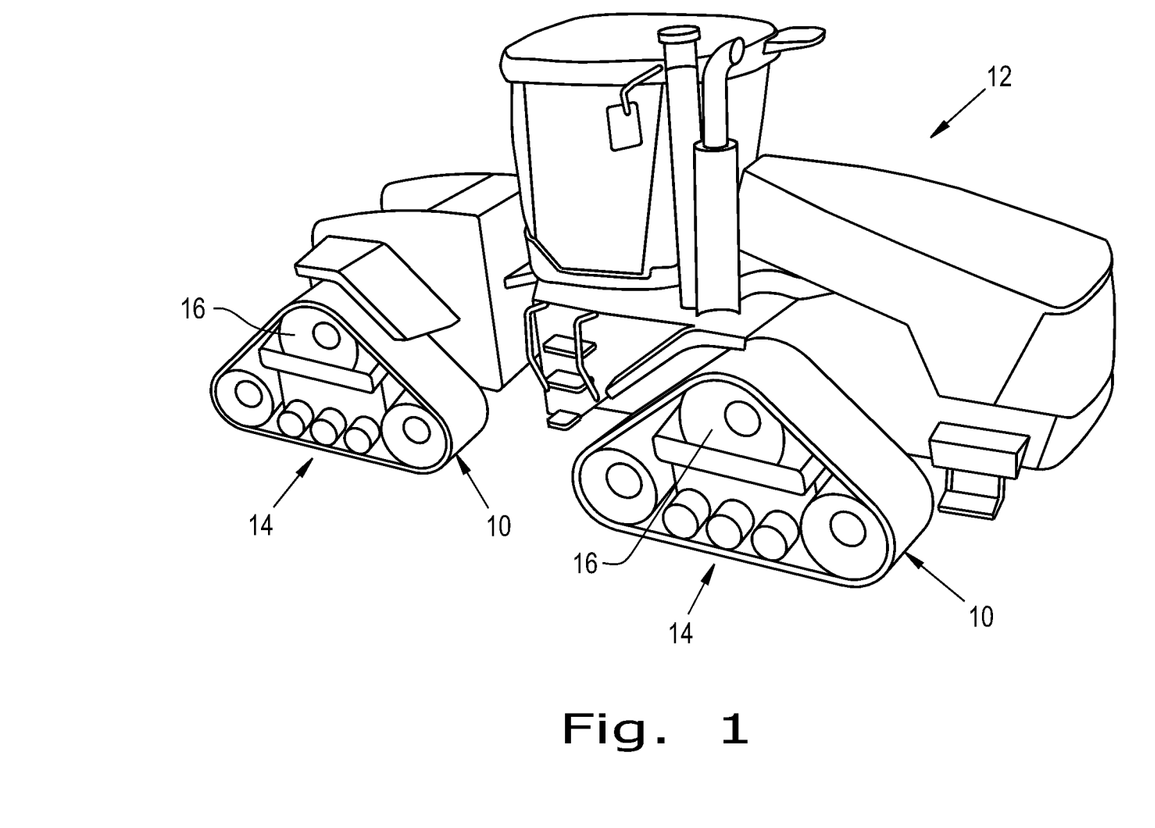
FIG. 1 is a perspective view of an agricultural vehicle in the form of a tractor having an embodiment of a ground contacting track of the present invention coupled to a drive train of the tractor.

Referring now to the drawings, and more particularly to FIG. 1, there is shown an embodiment of a rubberized track system 10 in use by a tractor 12. Tractor 12 has a drive train 14 that includes a drive sprocket 16, which drives track 10.

Figure 2:
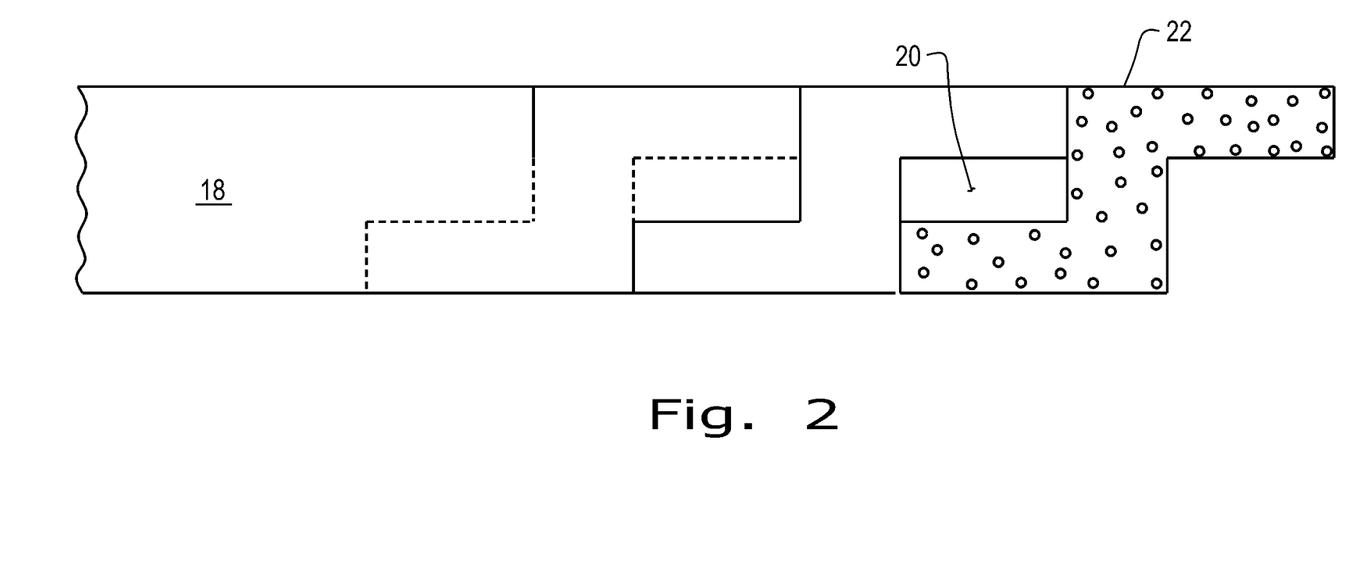
FIG. 2 is a view of a piece of strip steel from which stamped metal links of the present invention are made for use in the track of FIG. 1.
Figure 3:
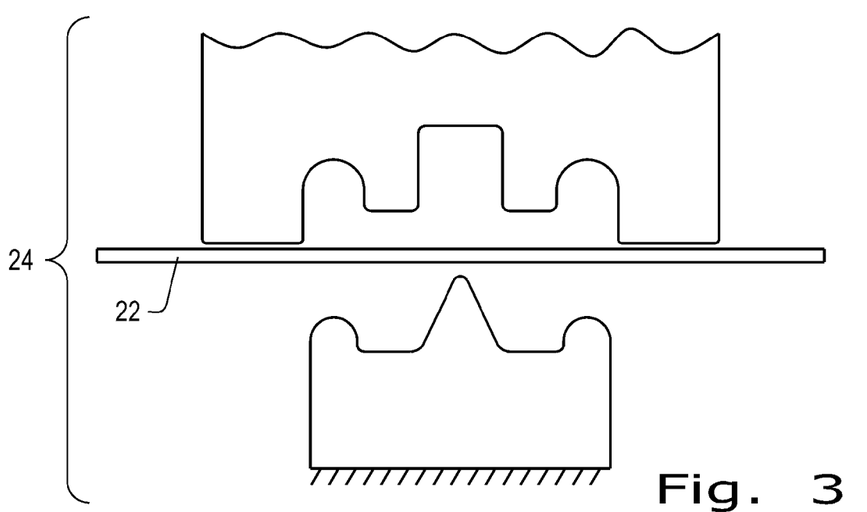
FIG. 3 is a schematical side view of a step in the forming process through which each stamped metal link previously processed in FIG. 2 is formed for use in the track of FIG. 1.
Figure 4:
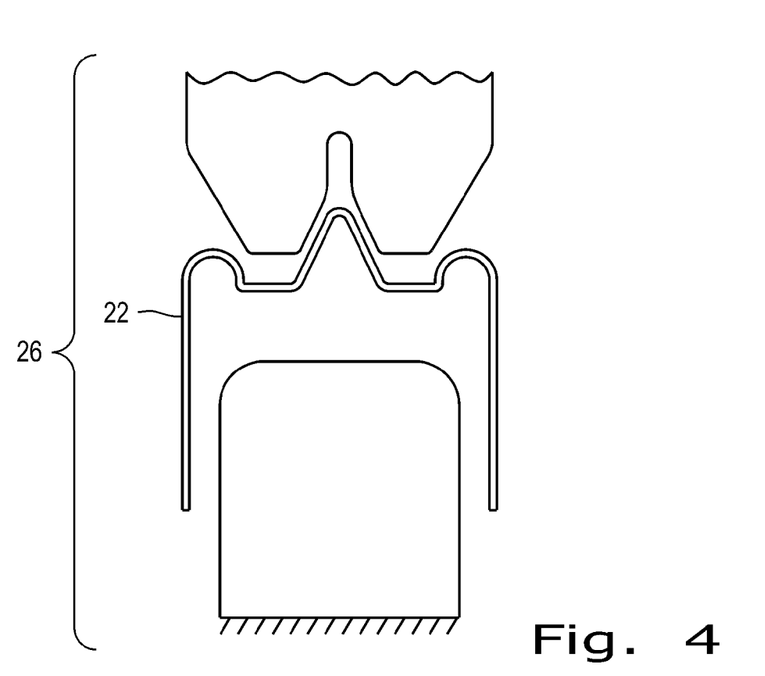
FIG. 4 is a schematical side view of another step in the forming process through which each stamped metal link previously processed in FIGS. 2 and 3 is formed for use in the track of FIG. 1.
Figure 5:
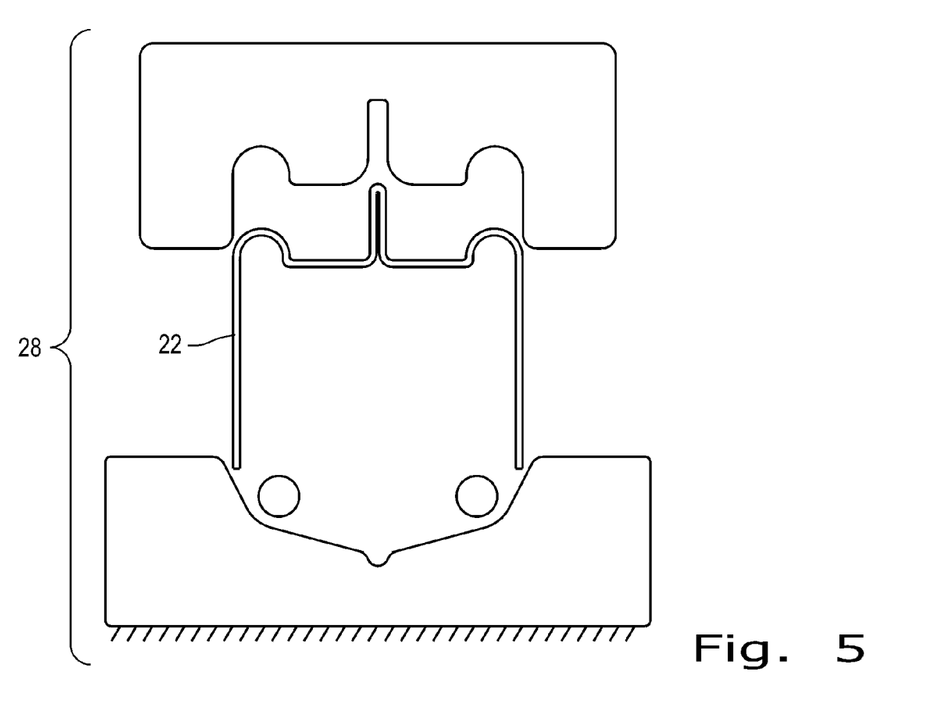
FIG. 5 is a schematical side view of another step in the forming process through which each stamped metal link previously processed in FIGS. 2-4 is formed for use in the track of FIG. 1.
Figure 6:
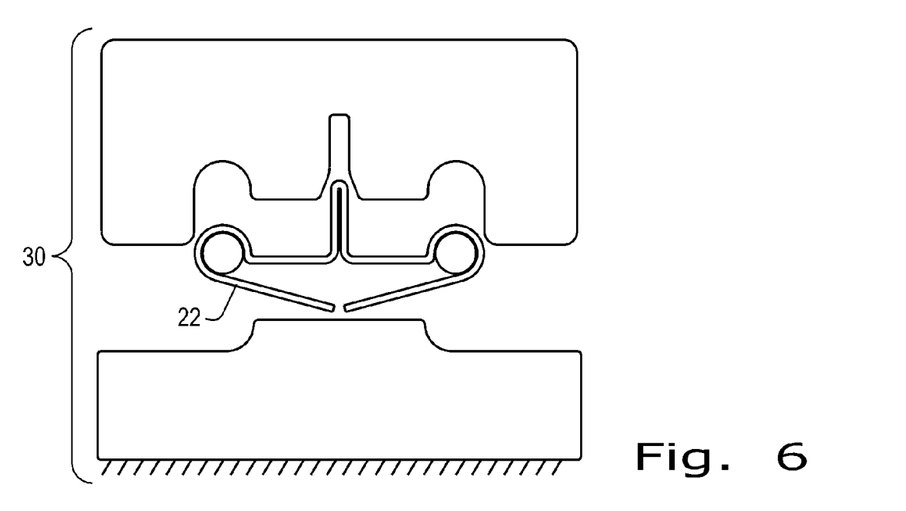
FIG. 6 is a schematical side view of another step in the forming process through which each stamped metal link previously processed in FIGS. 2-5 is formed for use in the track of FIG. 1.
Figure 7:
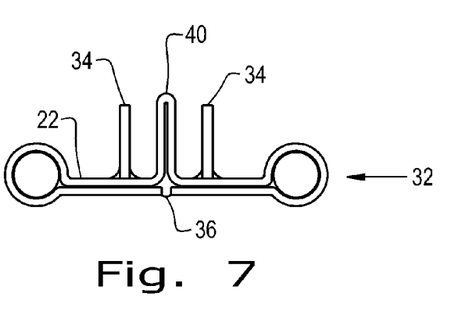
FIG. 7 is a side view of a stamped metal link processed by the steps portrayed in FIGS. 2-6 is formed for use in the track of FIG. 1.

Now, additionally referring to FIG. 2 there is shown a piece of strip steel 18 from which clamp plates 20 and stamped link forms 22 are made illustrated here in schematic form as parts of strip steel 18. It is possible that clamp plates 20 and stamped link forms 22 may be sized to significantly utilize most of strip steel 18 to thereby efficiently form the components with minimal scrap.

Now, additionally referring to FIGS. 3-7 there is shown die sets 24, 26, 28 and 30, which are used to progressively bend stamped link form 22 into a stamped metal link 32. Studs 34 may be welded to a surface of stamped metal link 32 or studs 34 may extend through a hole in stamped metal link 32, and then be welded thereto. A weld 36 is applied along the ends of the formed metal to hold stamped metal link 32 together as an integral unit.

Figure 8:
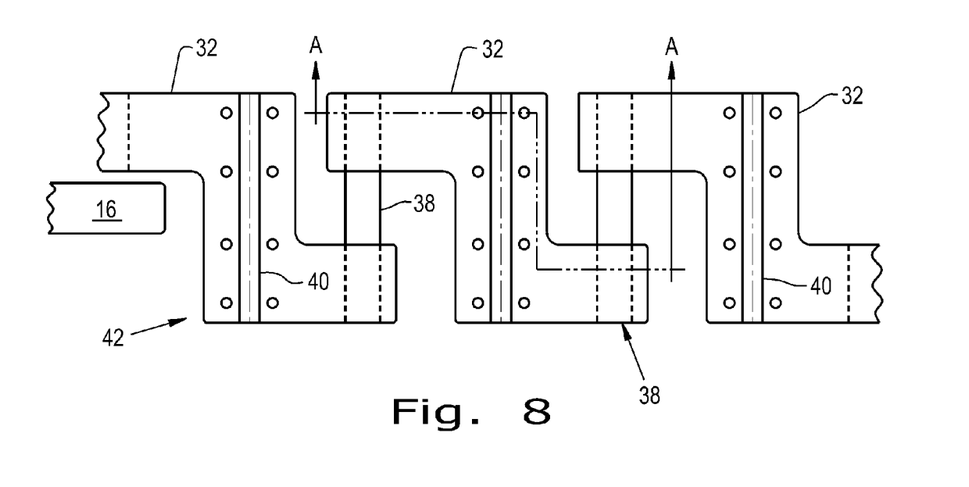
FIG. 8 is a top view of a series of the metal links of the present invention that are pivotally coupled together.

Now, additionally referring to FIG. 8, pins 38 are inserted in the corresponding openings of adjacent stamped metal links 32, which have cleats 40 extending outwardly, to form a track chain 42. Pins 38 may additionally have bushings associated therewith and even means to lubricate pins 38 to facilitate the pivotal coupling between pins 38 and stamped metal links 32. Stamped metal links 32 have a Z-shape or a stretched Z-shape, as can be seen in FIG. 8.

Figure 9:
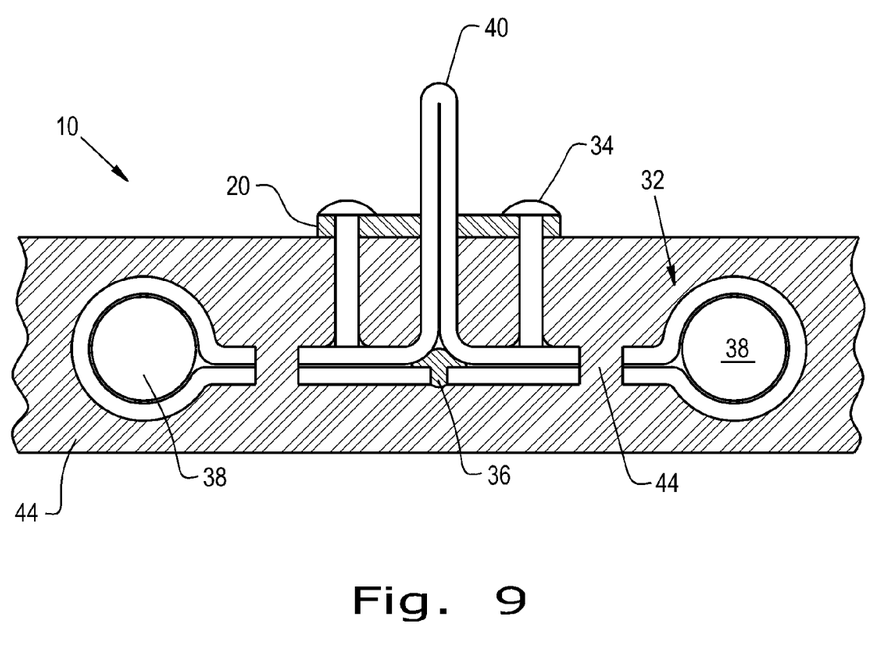
FIG. 9 is a side sectional view taken along A-A of FIG. 8 as fully assembled with a rubber member.

Now, additionally referring to FIG. 9, there is shown a cross-sectional view of a portion of track chain 42 in the finished rubberized track system 10, showing an elastomeric member 44, which may be referred to as a rubber member 44 that largely surrounds each stamped metal link 32, and the ends of pins 38. Cleat 40 extends through an outer surface of elastomeric member 44 and clamp plate 20 is placed around cleat 40 on the surface of elastomeric member 44 and studs 34 are riveted down upon clamp plate 20. Elastomeric member 44 covers over half of each stamped metal link 32, and can be thought of as mostly covering each of the stamped metal links 32 in track chain 42.

On the underside of rubberized track system 10, the middle portion of pins 38 is left exposed so that cogs of sprocket 16 can directly engage pins 38 to drive track system 10. The exposure of cleats 40 improve the traction of track system 10 over an all rubber track since cleat 40 readily engages the ground.

To summarize the inventive track 10 that can be used with a dozer crawler is made from rubber 44 over molded on links 32 with steel cleats 40 for traction and pinned connections 38. This allows for a "light" dozer track, but with steel cleats protruding outwardly farther than any other element of track 10, as can be seen in the figures. The general construction is vulcanized rubber 44 over-molded onto a chain 42 made of linked steel cleats 32, while also providing drive pins 38 in a form that allows direct interaction with sprocket 16. It is a preferred embodiment for the steel cleats/links to be made by using a production stamping method. Using recently developed steel that is mild enough to be formed by bending, but has sufficient chemistry to be heat treatable and hardened, such as steel discussed in US Patent application Publication No. 2013/0186526.

While conventional all metal tracks are made from a series of links pinned together to form a continuous track. The shoes are bolted to the links to form a continuous face. Presented to the ground, the face provides traction via cleats protruding from each shoe and flotation via the flat portion of each shoe. The traditional type track is heavy, complicated, and labor intensive to assemble. In addition, the links must be precision machined to form the pin holes. In addition, the pins must be precision machined to properly fit into the holes in the links. All this adds up to a very expensive track assembly.

The present invention solves these issues by providing the same durability and performance of an all metal track with rubber tracks. The rubber tracks 10 are less expensive, less complicated, and less noisy than conventional tracks.

The construction is a series of metal links 32 pinned together. At the top level of assembly, the track 10 is made when the chain 42 of pinned links 32 is positioned inside a rubber vulcanizing mold. The mold is loaded with rubber in the raw vulcanized state, and then the mold is clamped shut and heated. The rubber is vulcanized onto, or over-molded with the chain of links 42. The production mold and links are formed in such a way as to leave the center portion of each chain pin 38 exposed. This portion of pin 38 will be used to engage with the drive sprocket 16. Also the top portion 40 of each link 32 is left exposed. This portion of link 32 is used to engage the ground and provide a superior level of traction than could be achieved with rubber only. The links 32 will be formed in manufacturing using the stamping process, while the prior art track shoes are formed using the forging, extruding, or casting process. The stamping process used for the present invention is less expensive than any of the current methods of manufacturing and lends itself to high volume production.

The use of the formable, yet treatable steel makes the track shoe 32 hard and abrasive resistant enough to maintain its form after hundreds even thousands of hours of engaging soil, gravel, and rocks under high loads.

The entire track 10 is molded complete and all at once in a way similar to how an agricultural tractor track is molded. However, the present invention disclosed herein is over molded on a belt of metal links 32 that are pinned together to form a continuous band. This adds strength in tension, resistance against stretching, and provides lateral stiffness across the full width of track. Lateral stiffness helps to evenly distribute the weight of the equipment/load over a wide area. The larger "foot Print" provides flotation and decreases compaction of the ground beneath. The track pins 38 are exposed in the center area of the track. The exposed portion of the track pins are engaged by the cogged drive sprocket 16. The cogs of the drive sprocket 16 engage the track pins 38 and transfer torque and power to the track 10.

The use of a cogged drive sprocket 16 is the conventional way a tracked vehicle is driven, and is advantageously used by the present invention.

The internal links 32 are designed in such a way as to be made using the high production stamping process. Employing either a progressive or transfer type production die. The links 32 of the track "Chain" are formed in such a way as to present a strip of steel, which protrudes out of the rubber portion of the track assembly, and therefore provide high traction with the ground. The links 32 are also formed in such a way as to form a hole for the pivot pins 38 to engage and be fixed in. Rubber tracks have been used in smaller tracked construction equipment for many years. The links 32 are formed in such a way as to be pinned together continuously. In addition to providing a pivoting connection between all the links, the pins 38 provide a strong location for the drive sprocket to engage and transfer torque to the track 10.

In addition the links 32 are formed in such a way as to protrude above the main portion of the rubber track 10. The protrusion 40 taking the shape of a strip running laterally across the width of the track 10. The height to which this strip of steel 40 protrudes above the height of the main body of the track 10 being determined by the shape of the formed link 32. Thereby, the depth of the steel link protrusion 40 as it engages with the ground is controllable. Different levels of aggression can be produced, and offered for usage. This is the feature that elevates this track above conventional tracks in use today. The feature being a strip of steel protruding from the main body of the track to engage the ground and provide powerful traction when required for soil and gravel pushing operations.

Also described here is a preferred way to form the rubber adjacent to the protruding steel portion of the link to discourage delamination of rubber from steel. This way keeping the rubber bonded to the steel link. In addition, the invention described herein includes a mechanical way of bonding rubber to steel links to provide a robust lock between the two members. In the customary way a chemical "paint" is applied to the steel links prior to being inserted in the mold to provide a chemical bond between the rubber and steel components.

This track 10 allows for designs that work with existing dozers requiring no modification. The method of forming the holes to engage pivot pins in the links is not machined but formed in the stamping operation by bending the metal around a tooling mandrel. This is a cost reduction. The link 32 comes out of the stamping operation complete and ready for the heat treat/hardening process.

Advantages of the present invention include: Quiet operation as compared to an all metal track. Reduction of track generated noise. A strong commercial advantage if the industry continues using rubber track on larger vehicles. The use of stamped steel cleats could be used on any size vehicle that requiring increased traction. Cheaper to produce. A good alternative for a customer looking for something less costly.

In addition, the rubber 44 can be prevented from delaminating from the steel link 32 by way of clamp plate 20. The clamp plate 20 is riveted to welded studs 34 that are welded to the links 32 after forming.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A tracked vehicle, comprising:
   a chassis;
   a drive train coupled to said chassis; and
   at least one track driven by said drive train, said at least one track including:
      a plurality of stamped metal links each being pivotally coupled to corresponding adjacent ones of said plurality of metal links;
      an elastomeric member coupled to all of said plurality of stamped metal links, said elastomeric member covering most of each said stamped metal link, said stamped metal links each having a cleat extending outwardly of said elastomeric member, said cleat extending outwardly farther than any other element of the track; and
      a plurality of clamp plates, each coupled to a corresponding one of said plurality of said stamped metal links, said plurality of clamp plates positioned against a surface of said elastomeric member,
      wherein said plurality of stamped metal links each further have a cleat extending through the corresponding clamp plate.

2. The tracked vehicle of claim 1, wherein said track, track further includes a plurality of pins, said pins pivotally coupling said adjacent links together.

3. The tracked vehicle of claim 2, wherein said track further includes a plurality of clamp plates, each said clamp plate being coupled to a corresponding one of said stamped metal links, each said cleat extending outwardly beyond said clamp plate.

4. The tracked vehicle of claim 3, wherein a portion of each said pin is not covered by said elastomeric member.

5. The tracked vehicle of claim 4, wherein said drive train includes a drive sprocket, said portion of said pins interacting with said sprocket to transfer drive power from said drive sprocket to said track.

6. The tracked vehicle of claim 1, wherein said plurality of stamped metal links are stamped and formed into a stretched Z shape.

7. A track for a tracked vehicle having a drive train, the track comprising:
   a plurality of stamped metal links each being pivotally coupled to corresponding adjacent ones of said plurality of metal links;
   an elastomeric member coupled to all of said plurality of stamped metal links, said elastomeric member covering most of each said stamped metal link, said stamped metal links each having a cleat extending outwardly of said elastomeric member, said cleat extending outwardly farther than any other element of the track; and
   a plurality of clamp plates, each coupled to a corresponding one of said plurality of said stamped metal links, said plurality of clamp plates positioned against a surface of said elastomeric member,
   wherein said plurality of stamped metal links each further have a cleat extending through the corresponding clamp plate.

8. The track of claim 7, further comprising a plurality of pins, said pins pivotally coupling said adjacent links together.

9. The track of claim 7, wherein a portion of each said pin is not covered by said elastomeric member.

10. The track of claim 9, wherein the drive train has a drive sprocket, said portion of said pins being configured to interact with the sprocket to transfer drive power from the drive sprocket to said track.

11. The track of claim 7, wherein said plurality of stamped metal links are stamped and formed into a stretched Z shape.

* * * * *